(12) United States Patent
Lacy et al.

(10) Patent No.: US 10,443,437 B2
(45) Date of Patent: Oct. 15, 2019

(54) INTERWOVEN NEAR SURFACE COOLED CHANNELS FOR COOLED STRUCTURES

(71) Applicant: General Electric Company, Schenectady, NY (US)

(72) Inventors: Benjamin Paul Lacy, Greer, SC (US); Christopher Donald Porter, Mauldin, SC (US); David Edward Schick, Simpsonville, SC (US); Lyndsay Marie Kibler, Greenville, SC (US)

(73) Assignee: General Electric Company, Schenectady, NY (US)

( * ) Notice: Subject to any disclaimer, the term of this patent is extended or adjusted under 35 U.S.C. 154(b) by 454 days.

(21) Appl. No.: 15/342,185

(22) Filed: Nov. 3, 2016

(65) Prior Publication Data

US 2018/0119570 A1    May 3, 2018

(51) Int. Cl.
| | | |
|---|---|---|
| *F01D 25/12* | (2006.01) | |
| *F01D 11/08* | (2006.01) | |
| *F01D 5/18* | (2006.01) | |
| *F02C 3/04* | (2006.01) | |

(52) U.S. Cl.
CPC ............. *F01D 25/12* (2013.01); *F01D 5/187* (2013.01); *F01D 11/08* (2013.01); *F02C 3/04* (2013.01); *F05D 2230/22* (2013.01); *F05D 2230/50* (2013.01); *F05D 2240/11* (2013.01); *F05D 2240/128* (2013.01); *F05D 2240/30* (2013.01); *F05D 2240/81* (2013.01);
(Continued)

(58) Field of Classification Search
CPC .......... F01D 25/12; F01D 11/08; F01D 5/186; F01D 11/24; F01D 5/182; F01D 5/183; F05D 2240/11; F05D 2240/81; F05D 2240/30; F05D 2260/202; F05D 2260/203; F05D 2260/204; F23R 2900/03041; F23R 2900/03042; F23R 2900/03043
See application file for complete search history.

(56) References Cited

U.S. PATENT DOCUMENTS

| | | |
|---|---|---|
| 3,844,679 A | 10/1974 | Grondahl et al. |
| 4,353,679 A | 10/1982 | Hauser |
| 5,957,657 A | 9/1999 | Akita et al. |

(Continued)

OTHER PUBLICATIONS

Co-pending U.S. Appl. No. 14/880,565, filed Oct. 12, 2015.
(Continued)

*Primary Examiner* — Andrew H Nguyen
*Assistant Examiner* — Colin J Paulauskas
(74) *Attorney, Agent, or Firm* — Dority & Manning, P.A.

(57) ABSTRACT

A cooled structure of a gas turbine engine has a main body with a leading edge, a trailing edge, a first side portion, a second side portion, and a cavity. A first set of cooling air micro-channels extends from the cavity and is arranged along the first side portion. A second set of cooling air micro-channels extends from the cavity and is arranged along the second side portion. The first and second set of cooling air micro-channels have turning portions positioned adjacent each other and interwoven exhaust ends originating from each opposing side micro-channel. Each interwoven exhaust end extends around the opposing turning portion and is configured to exhaust cooling air from a plurality of exhaust ports positioned generally radially outward from the turning portions.

18 Claims, 6 Drawing Sheets

(52) U.S. Cl.
CPC .... *F05D 2250/71* (2013.01); *F05D 2260/204* (2013.01); *F05D 2260/2214* (2013.01)

(56) References Cited

U.S. PATENT DOCUMENTS

| | | | |
|---|---|---|---|
| 6,241,467 | B1 | 6/2001 | Zelesky et al. |
| 6,247,896 | B1 | 6/2001 | Auxier et al. |
| 6,340,285 | B1 * | 1/2002 | Gonyou ................ F01D 11/005 |
| | | | 415/116 |
| 6,905,302 | B2 | 6/2005 | Lee et al. |
| 8,096,772 | B2 | 1/2012 | Liang |
| 8,109,726 | B2 | 2/2012 | Liang |
| 8,182,224 | B1 | 5/2012 | Liang |
| 8,360,726 | B1 | 1/2013 | Liang |
| 8,449,246 | B1 | 5/2013 | Liang |
| 8,511,995 | B1 | 8/2013 | Liang |
| 8,632,298 | B1 | 1/2014 | Liang |
| 8,770,936 | B1 | 7/2014 | Liang |
| 9,015,944 | B2 | 4/2015 | Lacy et al. |
| 9,624,779 | B2 | 4/2017 | Schick et al. |
| 9,757,936 | B2 * | 9/2017 | Lacy ..................... B22F 3/1055 |
| 2008/0298975 | A1 | 12/2008 | James et al. |
| 2010/0226788 | A1 | 9/2010 | Liang |
| 2011/0088600 | A1 * | 4/2011 | MacRae ................. C21B 7/163 |
| | | | 110/182.5 |
| 2012/0057969 | A1 | 3/2012 | Jiang et al. |
| 2012/0082549 | A1 | 4/2012 | Ellis et al. |
| 2012/0328451 | A1 | 12/2012 | Lomas et al. |
| 2015/0007581 | A1 * | 1/2015 | Sezer ...................... F01D 11/24 |
| | | | 60/806 |
| 2015/0110612 | A1 | 4/2015 | Brandl et al. |
| 2016/0186575 | A1 | 6/2016 | Lacy et al. |
| 2017/0173671 | A1 * | 6/2017 | Auxier .................. B33Y 10/00 |

OTHER PUBLICATIONS

Co-pending U.S. Appl. No. 14/880,580, filed Oct. 12, 2015.
U.S. Appl. No. 14/971,383 filed Dec. 16, 2015.
U.S. Appl. No. 14/971,724 filed Dec. 16, 2015.
U.S. Appl. No. 14/971,478 filed Dec. 16, 2015.
U.S. Appl. No. 14/971,585 filed Dec. 16, 2015.
U.S. Appl. No. 14/971,674 filed Dec. 16, 2015.
Extended European Search Report and Opinion issued in connection with corresponding EP Application No. 17199311.6 dated Mar. 27, 2018.

* cited by examiner

INTERWOVEN NEAR SURFACE COOLED CHANNELS FOR COOLED STRUCTURES

FIELD

The disclosure relates generally to cooled structures of a gas turbine and more specifically to interwoven cooling channels routed to maximize edge cooling of the structures.

BACKGROUND

In a large frame heavy-duty industrial gas turbine engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

The first stage rotor blade and stator vanes are exposed to the highest gas stream temperatures, with the temperature gradually decreasing as the gas stream passes through the turbine stages. The first and second stage airfoils (blades and vanes) must be cooled by passing cooling air through internal cooling passages and discharging the cooling air through film cooling holes to provide a blanket layer of cooling air to protect the cooled surface from the hot gas stream.

The turbine rotor blades rotate within a cooled surface formed by a shroud which forms a gap with the blade tips. The shroud is formed of many segments secured within a ring carrier. A hot gas flow leakage that passes through the gap not only decreases the turbine efficiency but also creates hot spots on the shroud that result in erosion or other thermal induced damage for a short part life.

BRIEF DESCRIPTION

Aspects and advantages of the disclosure will be set forth in part in the following description, or may be obvious from the description, or may be learned through practice of the disclosure.

In one embodiment, a cooled structure of a gas turbine engine has a main body with a leading edge, a trailing edge, a first side portion, a second side portion, and a cavity. A first set of cooling air micro-channels extends from the cavity and is arranged along the first side portion. A second set of cooling air micro-channels extends from the cavity and is arranged along the second side portion. The first and second set of cooling air micro-channels have turning portions positioned adjacent each other and interwoven exhaust ends originating from each opposing side micro-channel. Each interwoven exhaust end extends around the opposing turning portion and is configured to exhaust cooling air from a plurality of exhaust ports positioned generally radially outward from the turning portions.

In another embodiment, the cooled structures described above are part of a gas turbine having a compressor section, a plurality of combustors in a combustion section positioned downstream from the compressor, and a turbine section positioned downstream from the combustion section.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
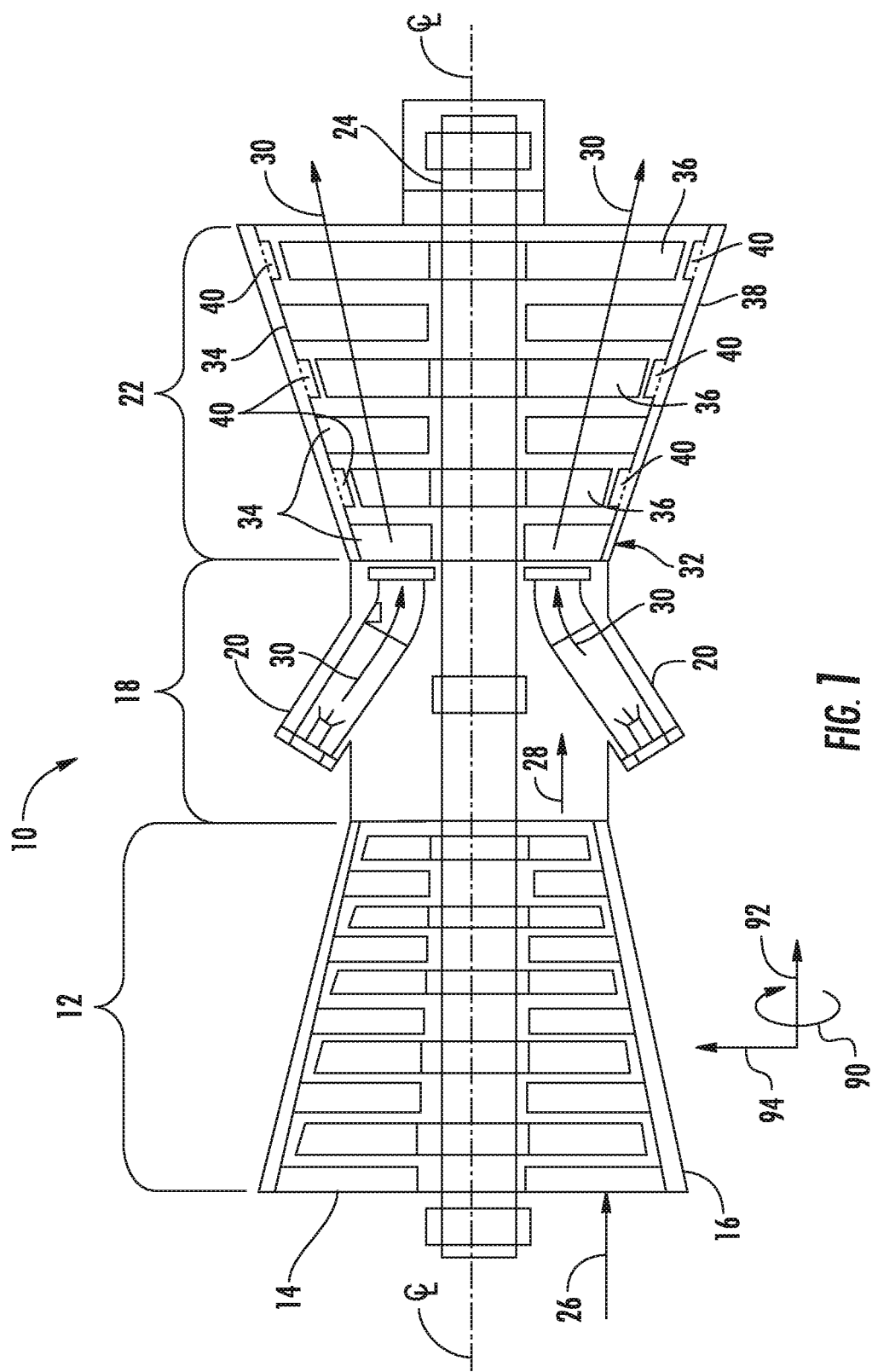
FIG. 1 is a schematic of a typical gas turbine as may incorporate various embodiments of the present invention.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" or "aft", and "downstream" or "forward" refer to the relative direction with respect to fluid flow in a fluid pathway. For example, "upstream" or "aft" refers to the direction from which the fluid flows, sometimes referred to as 'rear'. "Downstream" or "forward" refers to the direction to which the fluid flows, sometimes referred to as 'front'. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine and is not limited to an industrial gas turbine unless specifically recited in the claims. Although an industrial, marine, or land based gas turbine is shown and described herein, the present disclosure as shown and described herein is not limited to a land based and/or industrial, and/or marine gas turbine unless otherwise specified in the claims. For example, the disclosure as described herein may be used in any type of turbine including but not limited to an aero-derivative turbine or marine gas turbine as well as an aero engine turbine.

Cooled structures herein are defined as any structure requiring direct contact with a forced cooling air source to preserve the integrity of the structure. These structures can include portions of turbine shrouds, nozzles, blades, and any other hot gas path component of the turbine.

Referring now to the drawings, wherein like numerals refer to like components, FIG. 1 illustrates an example of a gas turbine 10 as may incorporate various embodiments of the present invention. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10.

In operation, air 26 is drawn into the inlet 14 of the compressor section 12 and is progressively compressed to provide a compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the gas turbine.

Figure 2:
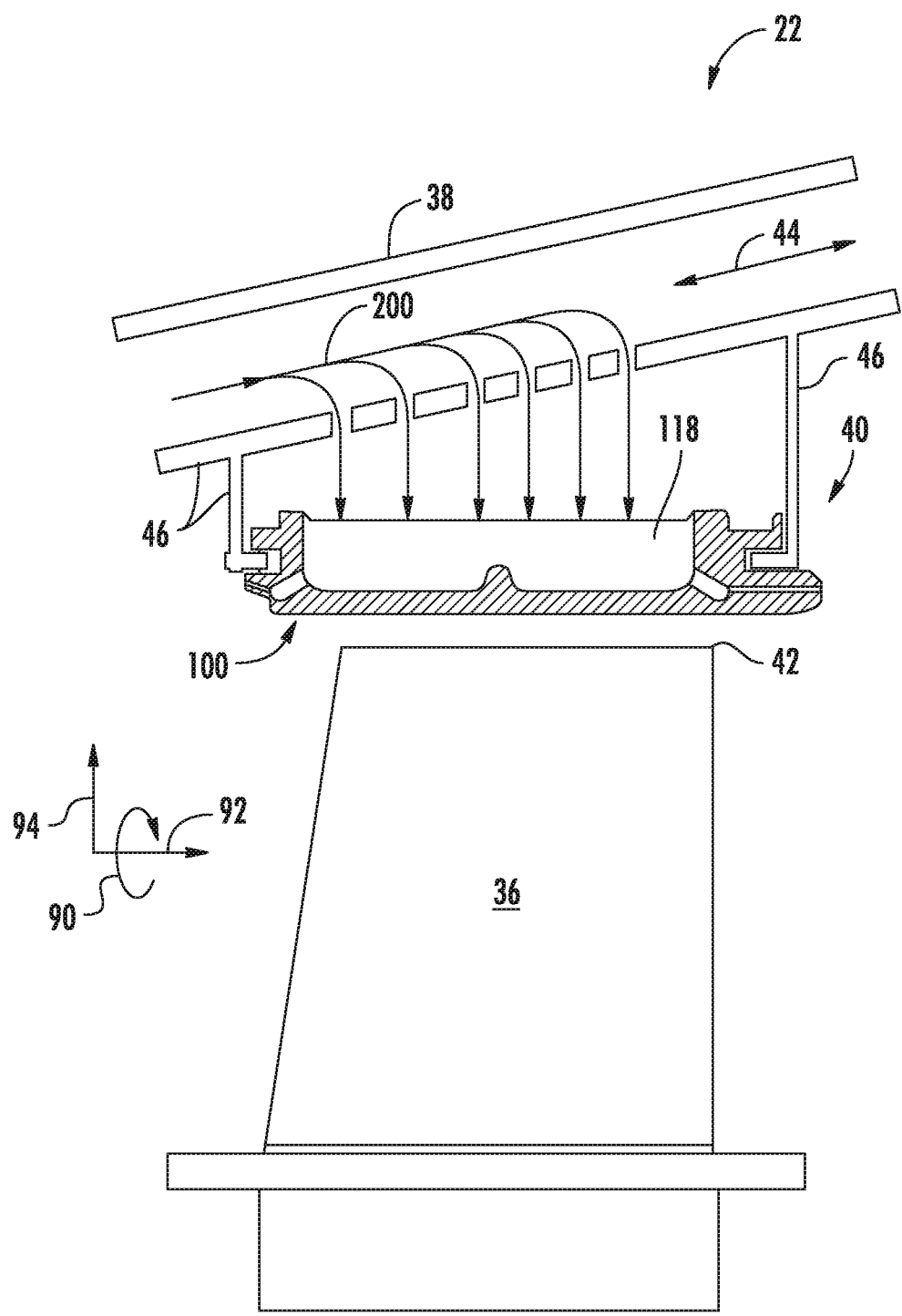
FIG. 2 is an enlarged cross section side view of a portion of the turbine section including an exemplary rotor blade and a portion of a stage two shroud block assembly according to various embodiments of the present disclosure.

FIG. 2 provides an enlarged cross section side view of a portion of the turbine section 22 including an exemplary rotor blade 36 and a portion of a stage two shroud block assembly 40 according to various embodiments of the present disclosure. As shown in FIG. 2, the shroud block assembly 40 generally extends radially between the turbine casing 38 and a tip portion 42 of the rotor blade 36. The shroud block assembly 40 is in fluid communication with a cooling flow path 44. The cooling flow path 44 may be at least partially defined by the turbine casing 38. The shroud block assembly 40 generally includes mounting hardware 46 for securing the shroud block assembly 40 to the turbine casing 38 and/or for supporting a plurality of shroud block segments 100 that are arranged in an annular array around the rotor blades 36 within the turbine casing 38.

Figure 3:
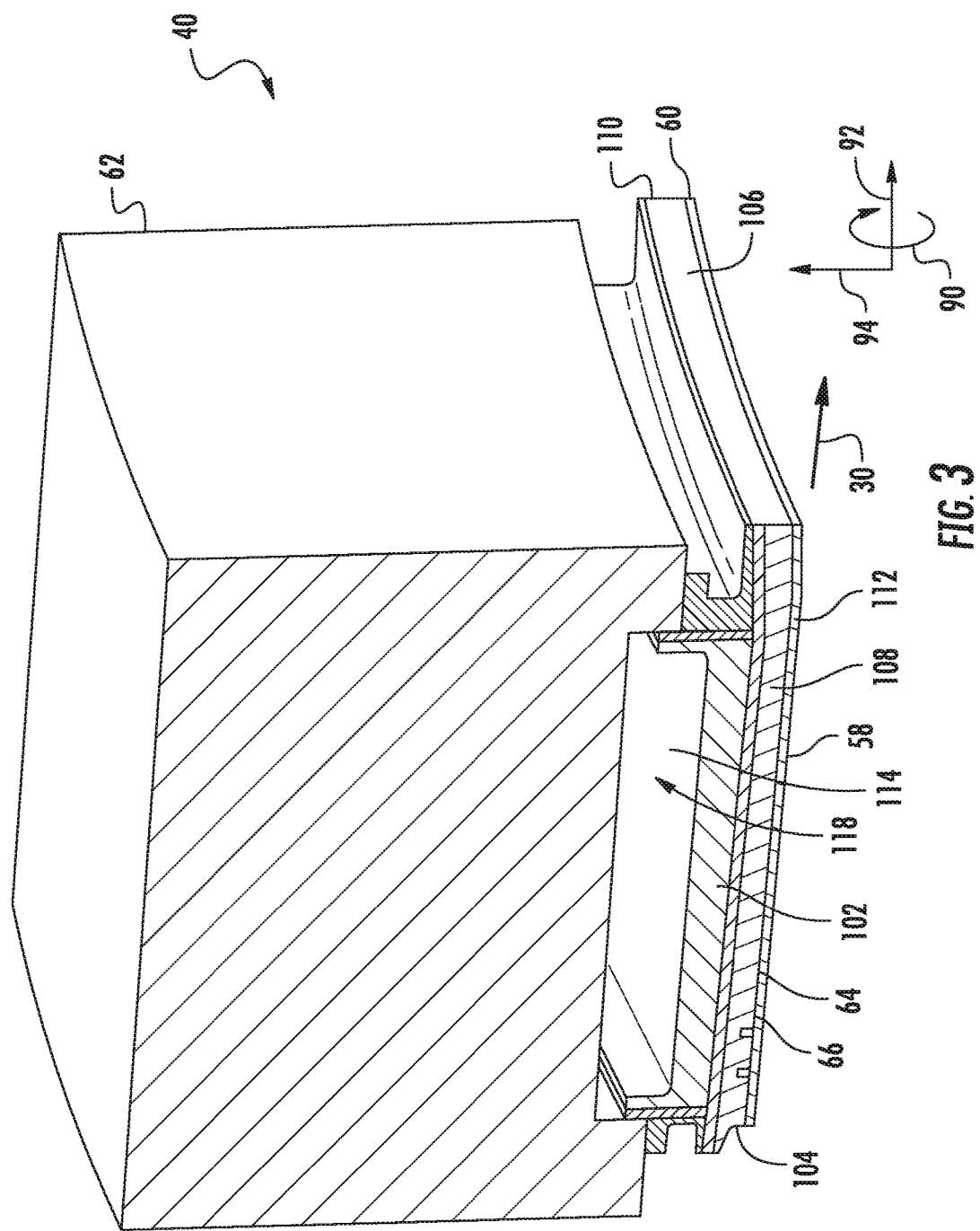
FIG. 3 is a perspective view of an embodiment of an inner turbine shroud segment coupled to an outer turbine shroud segment to form a turbine shroud block assembly, typical for stage one of a gas turbine.

FIG. 3 is a perspective view of an embodiment of an inner turbine shroud segment 60 coupled to an outer turbine shroud segment 62 to form a turbine shroud block assembly 40, typical example being for stage one of a gas turbine 10. The turbine 10 includes multiple turbine shroud block assemblies 40 that together form a ring about respective turbine stages. In certain embodiments, the turbine 10 may include multiple inner turbine shroud segments 60 coupled to respective outer turbine shroud segments 62 for each turbine shroud segment 40 disposed in the circumferential direction 90 about a rotational axis of the turbine 10. In other embodiments, the turbine 10 may include multiple inner turbine shroud segments 60 coupled to the outer turbine shroud segment 62 to form the turbine block assembly 40.

As depicted, the inner turbine shroud segment 60 includes a main body 102 having an upstream or leading edge 104 and a downstream or trailing edge 106 that both interface with a hot gas flow path 30. The main body 102 also includes a first side portion 108 (e.g., first slash face) and a second side portion 110 (e.g., second slash face) disposed essentially perpendicular to the leading edge 104 and the trailing edge 106. The main body 102 further includes a pair of opposed sides, the combustion gas side 112 and the back side 114 extending between the leading and trailing edges 104, 106 and the first and second side portions 108, 110. In certain embodiments, the main body 102 (particularly, opposing sides 112, 114) may be arcuate shaped in the circumferential direction 90 between the first and second side portions 108, 110 and/or in the axial direction 92 between the leading and trailing edges 104, 106. The back side 114 is configured to interface with a cavity 118 defined between the inner turbine shroud segment 60 and the outer turbine shroud segment 62.

Figure 4:
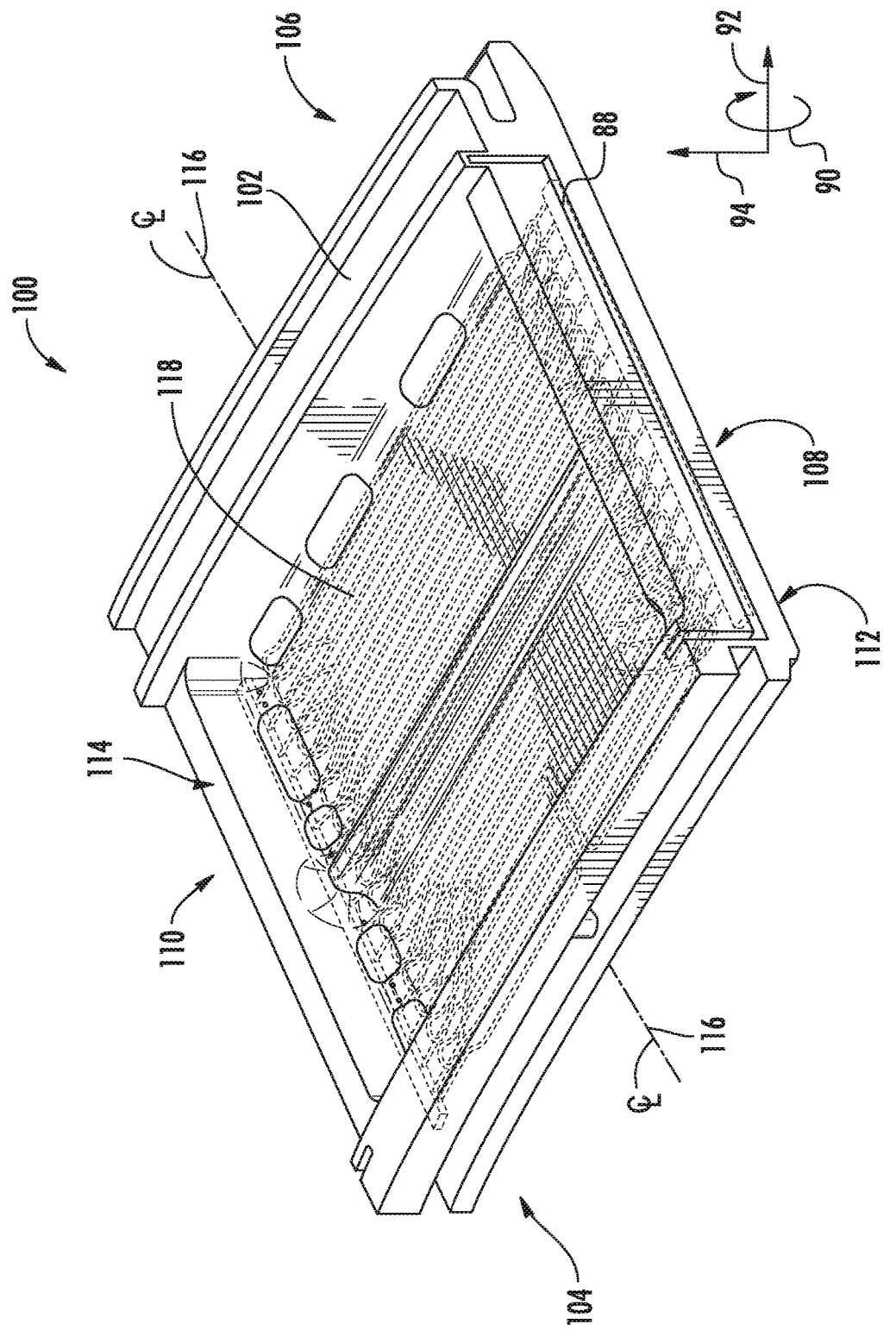
FIG. 4 is a perspective view of an inner turbine shroud segment having micro-channels according to various embodiments of the present disclosure.
Figure 5:
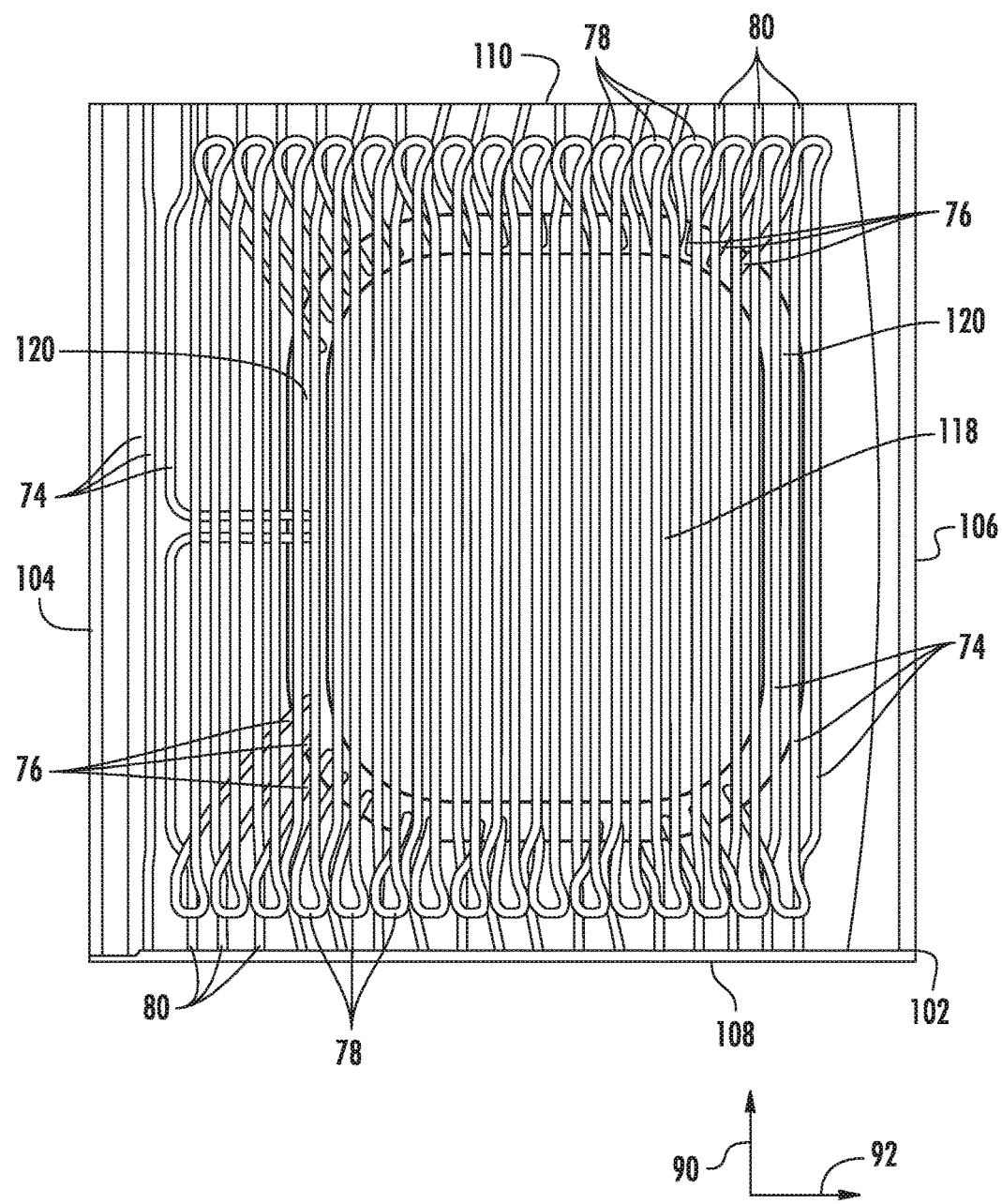
FIG. 5 is a bottom view of an embodiment of an inner turbine shroud segment micro-channels and without a pre-sintered preform (PSP) layer.

As seen in FIG. 4 and FIG. 5, the main body 102 may include multiple cooling air micro-channels 74 (e.g., cooling channels or micro-channels) disposed within the combustion gas side 112 to help cool the hot gas flow path components (e.g., turbine shroud 40, inner turbine shroud segment 60, etc.). In certain embodiments, some of these channels are disposed adjacent the trailing edge 106 or leading edge 104 with or without other channels disposed within the first and second side portions 108, 110 of the main body 102. In some embodiments, a pre-sintered preform (PSP) layer 58 may be disposed on (e.g., brazed onto) the combustion gas side 112 so that a first PSP surface 64 of the PSP layer 58 together with the main body 102 defines (e.g., enclose) the channels and a second PSP surface 66 of the PSP layer 58 interfaces with the hot gas flow path 30. The PSP layer 58 may be formed of superalloys, brazing materials, or mixtures thereof. In certain embodiments, as an alternative to the PSP layer 58, a non-PSP metal sheet may be disposed on the combustion gas side 112 that together with the main body 102 defines the channels. In some embodiments, as an alternative to the PSP layer 58, a barrier coating or thermal barrier coating may be utilized to enclose the channels within the main body 102.

In some embodiments, the cooled structures and micro-channels may be cast entirely, cut with liquid-jet guided laser technology (sometimes referred to as Liquid MicroJet), '3D-printed' with additive manufacturing processes, or precision machined within the main body 102 near the combustion gas side 112. Additive manufacturing build methods can include any form of binder jetting, directed energy deposition, material extrusion, material jetting, powder bed fusion, sheet lamination, and vat photopolymerization. More specifically, direct metal laser melting (DMLM) and direct metal laser sintering (DMLS) can be used to manufacture the cooled structures and micro-channels.

An example embodiment, shown in FIGS. 4 and 5, has a main body 102 that includes turning portions 78 positioned adjacent each other. The inner turbine shroud segment 60 is generally proximate to a cooling medium 200 or air (i.e., cooler than the temperature in the hot gas flow path 30 combustion gas side 112) in the turbine 10 from the compressor 12. The inner turbine shroud segment 60 includes an intake to receive the cooling fluid or air from the compressor 24 that provides the cooling fluid to the cavity 118. The cooling medium 200 flows to the channels 74 within the main body 102 of the inner turbine shroud segment 60 via intake ends 76 of the channels 74 disposed within the main body 102 extending from the back side 114. Each channel 74 includes a turning portion 78 having an intake end 76 and an exhaust end 82. The exhaust end 82 may include a metering feature (e.g., a portion of the main body 102 extending into the channel that narrows a cross-sectional area of a portion of the channel relative to an adjacent cross-sectional area of the channel) to regulate flow of the cooling fluid within the channel 74. In certain embodiments, each channel 74 itself (excluding the exhaust end portion) acts as a metering feature (e.g., includes a portion of the main body 102 extending into the channel). In other embodiments, intake end 76 coupled to the turning portion 78 may include a metering feature (e.g., portion of the main body 102 extending into the intake end 76). In certain embodiments, the channel 74 itself, the exhaust end 82, or the intake end 76, or a combination thereof includes a metering feature. In addition, the cooling fluid exits the channels 74 (and the main body 102) via the exhaust end 82 at the first side portion 108 and/or the second side portion 110. In certain embodiments, the channels may be arranged in an alternating pattern with a first set of channels having the intake end 76 disposed adjacent the first side portion 108 and the second set of channels having respective intake ends 76 disposed adjacent the second side portion 110, with adjacent channels having opposite orientation. The turning portions 78 of the channels 74 provide a larger cooling region (e.g., larger than typical cooling systems for turbine shrouds) by increasing a length of cooling channel 74 adjacent the slash faces 108, 110 while keeping cooling air flow to a minimum. In each set of channels, the turning portions 78 are positioned adjacent each other and incorporate interwoven exhaust ends 82 from the opposing side micro-channel 74. The interwoven exhaust ends 82 extend around the opposing turning portions 78, and are configured to exhaust cooling air 200 from a plurality of exhaust ports 80 positioned generally radially outward from the turning portions 78. The interwoven exhaust ends 82 can extend in most any direction around the turning portions 78, such as radially outward, axially forward, axially aft, and mixtures thereof. In certain embodiments, the main body 102 includes channels disposed adjacent the trailing edge 106 and leading edge 104 that are shaped different from the channels disposed on the rest of the main body 102. For example, the channels adjacent the trailing edge 106 or leading edge 104 may each include a serpentine pattern. The shape of the channels 74 is also optimized to provide adequate cooling in the event of plugged channels. The disclosed embodiments of the inner turbine shroud segment may enable cooling of the inner turbine shroud segment 60 with less air (e.g., than typical cooling systems for turbine shrouds) resulting in reduced costs associated with chargeable air utilized in cooling.

FIG. 4 provides a perspective view of an example shroud block segment 100 having micro-channels 74 according to various embodiments. As shown in FIG. 4, the shroud block segment 100 includes a main body 102 having a leading portion 104, a trailing portion 106, a first side portion 108 and an opposing second side portion 110. The first and the second side portions 108, 110 extend axially between the leading portion 104 and the trailing portion 106. The main body 102 further includes a combustion gas side 112 that is radially separated from an opposing back side 114. The combustion gas side 112 has a generally arcuate or circumferential shape with respect to an axial centerline 116 of the shroud block segment 100. The combustion gas side 112 may be coated with a heat resistant coating such as a thermal barrier coating or the like. A cooling pocket or cavity 118 is defined in the back side 114. The cavity 118 is at least partially defined between the leading portion 104, the trailing portion 106, the first side portion 108 and the opposing second side portion 110. The cavity 118 is positioned radially outward from the combustion gas side 112 and further defines an angled perimeter wall 120. The angled perimeter wall 120 can be disposed at any suitable angle as measured from the radial direction 94, from about 0 degrees to about 90 degrees, to enable proper distribution of cooling air around the cavity 118 at the intake ends 76 of the micro-channels 74.

FIG. 5 is a bottom view of an embodiment of cooling air micro-channels 74 positioned in an inner turbine shroud segment 60 without the PSP layer 58. As depicted, the main body 102 includes a plurality of channels 74 (e.g., cooling channels or micro-channels) disposed within the combustion gas side 112. The main body 102 may include 2 to 40 or more channels 74. Each channel 74 is configured to receive a cooling fluid from the cavity 118. Each channel 74 includes an intake end portion 76 that includes a turning portion 78 positioned adjacent each other. Each turning portion 78 has a turn radius 84 ranging from approximately 0.05 to 13 millimeters (mm), 0.1 to 10 mm, 1.14 to 7 mm, and all sub-ranges therebetween. The intake end 76 of each turning portion 78 is coupled to the cavity 118 to receive the cooling fluid from the cavity 118. The curvature of the turning portion 78 and interwoven radially displaced exhaust ends 82 enables channels 74 and turning portions 78 to be positioned adjacent each other within the first and second side portions 108, 110. In addition, the turning portion 78 and interwoven radially displaced exhaust ends 82 provide a larger cooling region by increasing a length of cooling channel 74 adjacent the side portions 108, 110 while keeping flow at a minimum. And, the turning portion 78 and interwoven radially displaced exhaust ends 82 enables better spacing of the straight portions of the channels 74. Further, the loop shape of the turning portion 78 and interwoven radially displaced exhaust ends 82 enables the straight portions of the channels to be uniformly distant from an adjacent channel to avoid thermal gradients and uniformly cool the main portion of the main body 102 of the shroud segment 40. In certain embodiments, the turning portion 78 could be adjusted to enable the spacing of the straight portions of the channels 74 to be tighter packed for higher heat load zones. Overall, the shape of the channels 74 is also optimized to provide adequate cooling in the event of plugged channels 74. Each channel 74 also includes an exhaust end 82 that enables the spent cooling fluid to exit the main body 102 via the side portions 108, 110 via exhaust ports 80 as indicated by the arrows. In certain embodiments, the exhaust ends 82 include a metering feature configured to regulate (e.g., meter) a flow of the cooling fluid within the respective channel 74. In certain embodiments, each channel 74 may form a segmented channel at the exhaust end 82. In certain embodiments, each channel 74 itself, excluding the exhaust end 82, acts as a metering feature. In other embodiments, intake ends 76 coupled to the turning portion 78 may include a metering feature (e.g., portion of the main body 102 extending into the intake end 76). In certain embodiments, the channel 74 itself, the exhaust end 82, or the intake end 76, or a combination thereof includes a metering feature.

Figure 6:
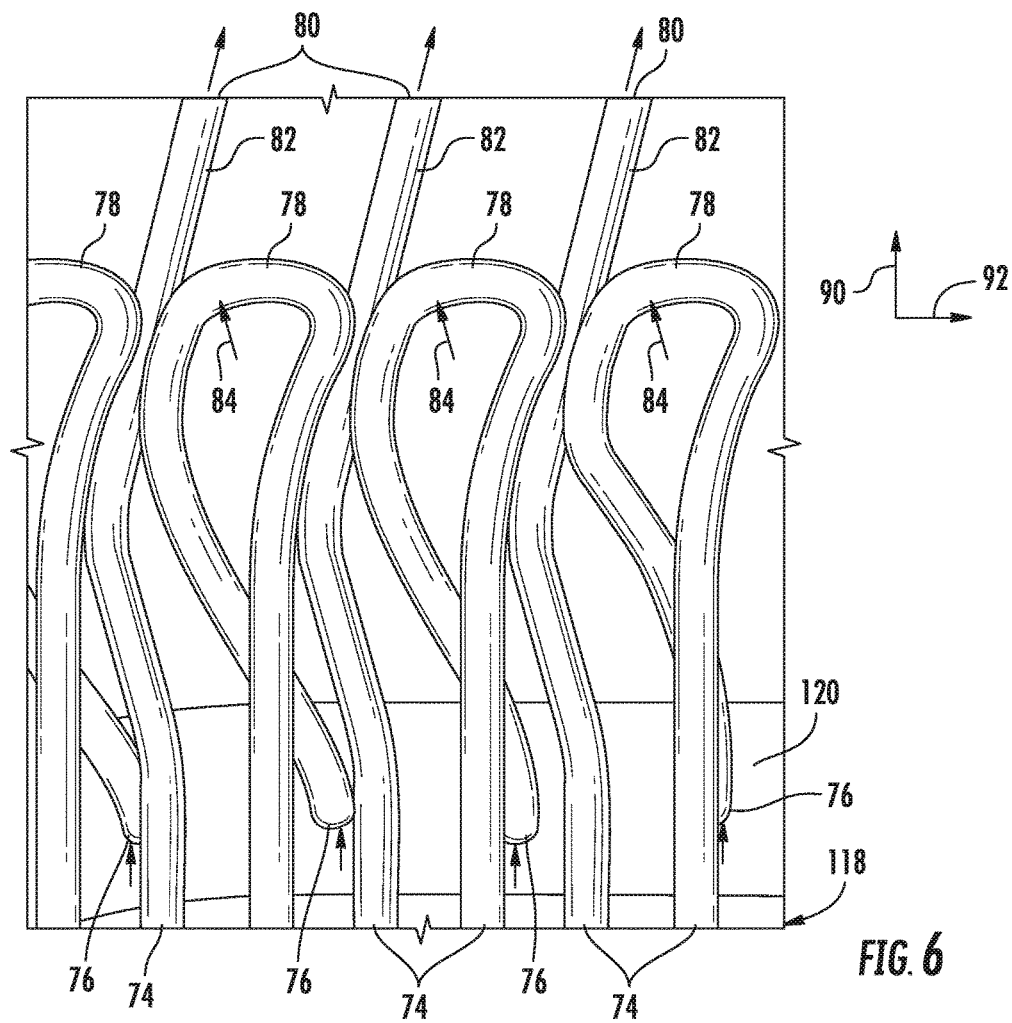
FIG. 6 is an enlarged bottom view showing exhaust ends interwoven with turning portions of the micro-channels.

FIG. 6 is an enlarged bottom view showing opposing exhaust ends 82 routed through a first side portion 108 and interwoven with turning portions 78 of the micro-channels 74 at differing elevations in the radial direction. The interwoven geometry of the exhaust ends 82 with the turning portions 78 is shown, as well as the intake end 76 connection to the angled perimeter wall 120 at a different elevation.

Figure 7:
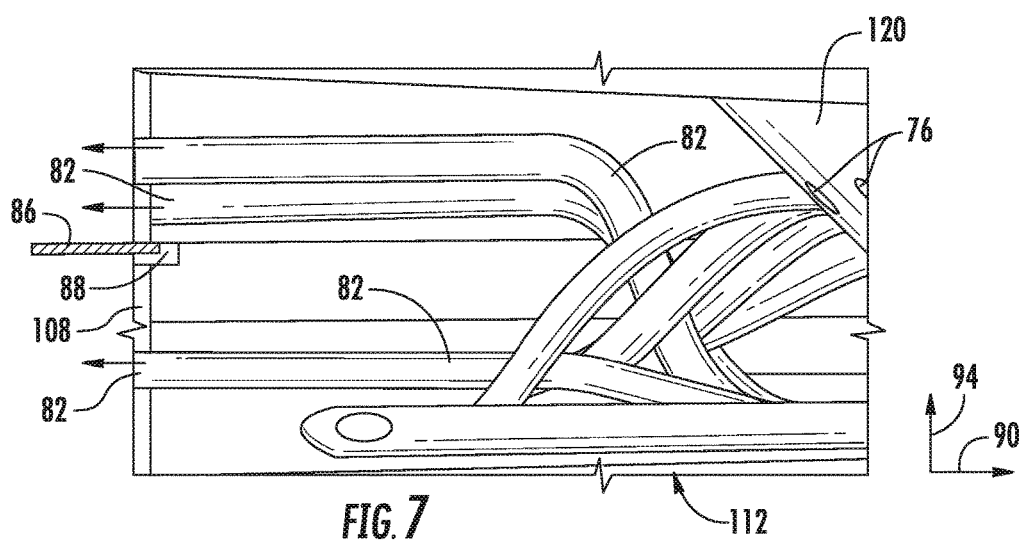
FIG. 7 is an enlarged side view of a first side portion (e.g. first slash face) showing exhaust ends extending generally radially outward from a combustion gas side surface to interweave between turning portions of the micro-channels and exhaust cooling air from exhaust ports positioned generally radially outward from the turning portions.

FIG. 7 is an enlarged side view of a first side portion 108 (e.g. first slash face) showing exhaust ends 82 extending generally radially outward from a combustion gas side 112, or any hot gas surface, to interweave between turning portions 78 of the micro-channels 74 and exhaust cooling air from exhaust ports 80 positioned generally radially outward from the turning portions 74. A seal 86 is shown at the first side portion 108, disposed within the seal slot 88 as shown in FIG. 4, with the exhaust ends 82 routed to exhaust both above and below the seal 86.

In some embodiments, the shroud block assembly 40 can be considered a cooled structure as disclosed herein. The cooling air micro-channels 74 can form a flow passage parallel with a combustion gas side 112. Also, each cooling air micro-channel 74 can have an intake end 76 positioned around the angled perimeter wall 120 of the cavity 118, or any other position on the shroud block assembly 40 exposed to the cooling air 200, such that the intake end 76 is configured to accept compressed cooling air 200 from a cooling flow path 44.

In some embodiments of the cooled structure, intake ends 76 are interwoven and configured to cross over at least two turning portions 78. In additional embodiments the radius 84 of the turning portions 78 is sufficient to cross over at least two intake ends 76 and/or sufficient to cross over at least two exhaust ends 82.

In other embodiments, each cooling air micro-channel exhaust port 80 is positioned in at least one position selected from the group consisting of radially inward of a seal 86, radially outward of a seal 86, and mixtures thereof. In yet another embodiment, the exhaust ends 82 are interwoven and configured to cross over at least two turning portions 78. In additional embodiments, the turning portions 78 are configured to overlap each other in the radial direction.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooled structure of a gas turbine engine, the gas turbine comprising a shaft defining an axial direction, the gas turbine also defining a radial direction perpendicular to the axial direction and a circumferential direction extending around the axial direction, the cooled structure comprising;
    a main body having a leading edge, a trailing edge, a first side portion, a second side portion, and a cavity;
    a first cooling channel extending from a first intake end coupled to the cavity proximate the first side portion of the main body towards the first side portion of the main body to a first turning portion, from the first turning portion to a first exhaust end proximate the second side portion of the main body, and from the first exhaust end to a first exhaust port on the second side portion of the main body; and
    a second cooling channel extending from a second intake end coupled to the cavity proximate the second side portion of the main body toward the second side portion of the main body to a second turning portion, from the second turning portion to a second exhaust end proximate the first side portion of the main body, and from the second exhaust end to a second exhaust port on the first side portion of the main body;
    wherein the first cooling channel and the second cooling channel are interwoven with the first turning portion radially overlapping the second exhaust end and the second turning portion radially overlapping the first exhaust end.

2. The cooled structure of claim 1, further comprising a third cooling channel extending from said cavity and arranged along the leading edge or the trailing edge.

3. The cooled structure of claim 1, wherein the first exhaust end extends radially outward to the first exhaust port and the second exhaust end extends radially outward to the second exhaust port.

4. The cooled structure of claim 1, wherein said cavity further defines an angled perimeter wall.

5. The cooled structure of claim 4, wherein the first intake end is coupled to the angled perimeter wall of the cavity and the second intake end is coupled to the angled perimeter wall of the cavity, and wherein the first intake end and the second intake end are each configured to accept compressed cooling air from a cooling flow path via the cavity.

6. The cooled structure of claim 5, wherein the first cooling channel is one of a first plurality of cooling channels, each cooling channel of the first plurality of cooling channels extending from an intake end coupled to the cavity proximate the first side portion of the main body towards the first side portion of the main body to a turning portion, from the turning portion to an exhaust end proximate the second side portion of the main body, and from the exhaust end proximate the second side portion of the main body to an exhaust port on the second side portion of the main body, and wherein the turning portions of adjacent cooling channels of the first plurality of cooling channels both radially overlap the second exhaust end.

7. The cooled structure of claim 1, wherein the first exhaust port and the second exhaust port are positioned radially inward of a seal, radially outward of the seal, or combinations thereof.

8. The cooled structure of claim 1, wherein the second cooling channel is one of a second plurality of cooling channels, each cooling channel of the second plurality of cooling channels extending from an intake end coupled to the cavity proximate the second side portion of the main body towards the second side portion of the main body to a turning portion, from the turning portion to an exhaust end proximate the first side portion of the main body, and from the exhaust end proximate the first side portion of the main body to an exhaust port on the first side portion of the main body, and wherein the turning portions of adjacent cooling channels of the second plurality of cooling channels both radially overlap the first exhaust end.

9. A method of making a cooled structure comprising additively building the cooled structure of claim 1 by binder jetting, directed energy deposition, material extrusion, material jetting, powder bed fusion, sheet lamination, vat photopolymerization, or combinations thereof.

10. A gas turbine, comprising:
a shaft defining an axial direction, the gas turbine also defining a radial direction perpendicular to the axial direction and a circumferential direction extending around the axial direction;
a compressor section;
a combustion section positioned downstream from said compressor section;
a turbine section positioned downstream from said combustion section;
wherein said gas turbine comprises a plurality of cooled structures, each cooled structure comprising:
a main body having a leading edge, a trailing edge, a first side portion, a second side portion, and a cavity;
a first cooling channel extending from a first intake end coupled to the cavity proximate the first side portion of the main body towards the first side portion of the main body to a first turning portion, from the first turning portion to a first exhaust end proximate the second side portion of the main body, and from the first exhaust end to a first exhaust port on the second side portion of the main body; and
a second cooling channel extending from a second intake end coupled to the cavity proximate the second side portion of the main body toward the second side portion of the main body to a second turning portion, from the second turning portion to a second exhaust end proximate the first side portion of the main body, and from the second exhaust end to a second exhaust port on the first side portion of the main body;
wherein the first cooling channel and the second cooling channel are interwoven with the first turning portion radially overlapping the second exhaust end and the second turning portion radially overlapping the first exhaust end.

11. The gas turbine of claim 10 comprising a third cooling channel extending from said cavity and arranged along one of the leading edge and the trailing edge.

12. The gas turbine of claim 10, wherein the first exhaust end extends radially outward to the first exhaust port and the second exhaust end extends radially outward to the second exhaust port.

13. The gas turbine of claim 10, wherein said cavity further defines an angled perimeter wall.

14. The gas turbine of claim 13, wherein the first intake end is coupled to the angled perimeter wall of the cavity and the second intake end is coupled to the angled perimeter wall of the cavity, and wherein the first intake end and the second intake end are each configured to accept compressed cooling air from a cooling flow path via the cavity.

15. The gas turbine of claim 14, wherein the first cooling channel is one of a first plurality of cooling channels, each cooling channel of the first plurality of cooling channels extending from an intake end coupled to the cavity proximate the first side portion of the main body towards the first side portion of the main body to a turning portion, from the turning portion to an exhaust end proximate the second side portion of the main body, and from the exhaust end proximate the second side portion of the main body to an exhaust port on the second side portion of the main body, and wherein the turning portions of adjacent cooling channels of the first plurality of cooling channels both radially overlap the second exhaust end.

16. The gas turbine of claim 10, wherein the first exhaust port and the second exhaust port are positioned radially inward of a seal, radially outward of the seal, or combinations thereof.

17. The gas turbine of claim 10, wherein the second cooling channel is one of a second plurality of cooling channels, each cooling channel of the second plurality of cooling channels extending from an intake end coupled to the cavity proximate the second side portion of the main body towards the second side portion of the main body to a turning portion, from the turning portion to an exhaust end proximate the first side portion of the main body, and from the exhaust end proximate the first side portion of the main body to an exhaust port on the first side portion of the main body, and wherein the turning portions of adjacent cooling channels of the second plurality of cooling channels both radially overlap the first exhaust end.

18. The gas turbine of claim 10, wherein the turning portions have a turn radius in the range of about 0.05 to 13 millimeters.

* * * * *